United States Patent

Nogaj

[15] 3,669,422
[45] June 13, 1972

[54] AERATION APPARATUS

[72] Inventor: Richard J. Nogaj, Winfield, Ill.

[73] Assignee: Keene Corporation

[22] Filed: Oct. 19, 1970

[21] Appl. No.: 81,994

[52] U.S. Cl. .................................. 261/34, 210/242, 261/91, 261/120
[51] Int. Cl. .......................................... B01f 7/16
[58] Field of Search .................... 210/242; 261/34, 91, 120

[56] References Cited

UNITED STATES PATENTS

| | | | |
|---|---|---|---|
| 3,416,729 | 12/1968 | Ravitts et al. | 261/91 |
| 3,493,216 | 2/1970 | Johnson | 261/120 |

Primary Examiner—Tim R. Miles
Assistant Examiner—Steven H. Markowitz
Attorney—James R. Campbell and Charles W. Helzer

[57] ABSTRACT

An aerator for use in waste water treatment plants for imparting oxygen to liquid moving through the system including a buoyant pontoon having a central opening designed to float on the liquid. A motor mounted on the pontoon has its shaft extending axially through the pontoon opening and propeller blades are attached to the end of the shaft for pumping the liquid up through the opening and outwardly therefrom for imparting oxygen to the liquid. A shelf located on the pontoon upper surface is dry when the unit is not in operation and therefore tends to counterbalance the downward pull of the propellers during starting. As a portion of the pumped liquid fills the tray, it acts as a ballast for the unit during the pumping operation.

11 Claims, 4 Drawing Figures

Inventor
Richard J. Nogaj
by James R Campbell
His Attorney

Inventor
Richard J. Nogaj
By James R Campbell
His Attorney

AERATION APPARATUS

FIELD OF THE INVENTION

The invention described herein relates to aeration apparatus and more particularly to an improved floating surface aerator for transferring oxygen to waste waters and other liquids, especially those used in biological processes.

In the operation of waste water treatment plants, particularly sewage systems in industrial and municipal operations, the biological processes taking place therein required substantial amounts of oxygen for decomposing solid waste materials. Since these processes cannot continue in large plants unless oxygen is replenished in the system, conventional practices for replacing used oxygen consists of pumping air through diffusers located in the bottom of sewage system tanks or by mechanically aerating the water near the surface of the tank by projecting it into the air where it absorbs oxygen before falling back to the surface. In either event, the introduction of air, and therefore oxygen, is made in a manner such that continual circulation of the waste waters in the tanks take place.

This invention relates to the design of a mechanical type of aerator adapted to float on the surface of water in a sewage system tank. The aerator usually consists of a doughnut-shaped float which supports a vertically disposed motor. Propeller blades mounted on the end of the motor shaft are located immediately adjacent the central opening in the float and upon operation of the motor, the propeller blades force water up an in-take tube for projection radially outwardly by stationary deflectors mounted immediately below the motor. As the water disperses into multiple droplets, a large surface area is exposed to the air thus permitting the absorption of oxygen prior to its return to the tank.

Such mechanical aerators of the type described above are subject to numerous disadvantages. In most designs the end of the motor shaft is supported in a guide bearing which is either lubricated by the waste water or oil lubricated by a totally enclosed bearing. Since the impeller imparts vibrational forces of varying frequency and magnitude to the bearing, such forces over a period of time cause substantial wear in the bearing materials, thus causing the vibrations to be transmitted through the motor shaft to the motor bearings, thereby accelerating wear in the motor bearings with consequent substantial maintenance being necessary to keep them in proper operating condition. Further, provision must be made for the design and construction of the stationary deflectors, which adds to the cost, and since the deflectors are permanently located in a set position, any impediments in the form of foreign matter in the deflectors cause the liquid ejected by the motor propellers to take unusual paths so that complete aeration of the water does not take place.

The major disadvantage associated with this type of mechanical aerator is that since the propeller blades are located a substantial distance below the water surface, upon starting, the propeller digs into the water and generates high initial thrust forces which in turn create current overloading conditions in the motor. Therefore, during the starting phase, the motor windings are not only exposed to the normal starting current of about six times the normal full load running current, but also, the added thrust forces tend to increase the starting current with the result that the windings develop excessive heat which adversely affects the winding insulation and reduces the motor life and efficiency. This is particularly true in those situations where the motor is repeatedly cycled under abnormal conditions of operation.

It has been found that to overcome the aforementioned disadvantages larger motors than that normally needed for the installation are required to handle the pumping loads and extremely rugged guide bearings must be furnished to accommodate the lateral forces. As a result costs for construction are higher than what should be expected in this kind of installation.

The object of my invention, therefore, is to provide an improved design of mechanical aerator at less cost, greater efficiency and less maintenance than currently available aerators of this type.

Another object of my invention is to provide a combined impeller and deflector for projecting water into the air at uniform flow and dispersion rates.

Still another object of my invention is to provide a design of mechanical aerator incorporating soft start features which will permit the unit to repeatedly seek and retain optimum operating positions in the water.

Briefly stated, I carry out the above objects of my invention by providing a mechanical aerator of the general configuration known in the prior art but which includes an integral impeller and deflector for forcing water into the air at a uniform rate. By designing the aerator to have a low center of gravity, soft starting characteristics and provision for water ballast, a mechanical aerator of unique design and efficiency results.

While the specification concludes with claims particularly pointing out and distinctly claiming the subject matter which I regard as my invention, it is believed the invention will be better understood from the following description taken in connection with the accompanying drawings in which FIG. 1 is a perspective view, partly in section, illustrating the novel features of the aerator of my invention.

Figure 1:
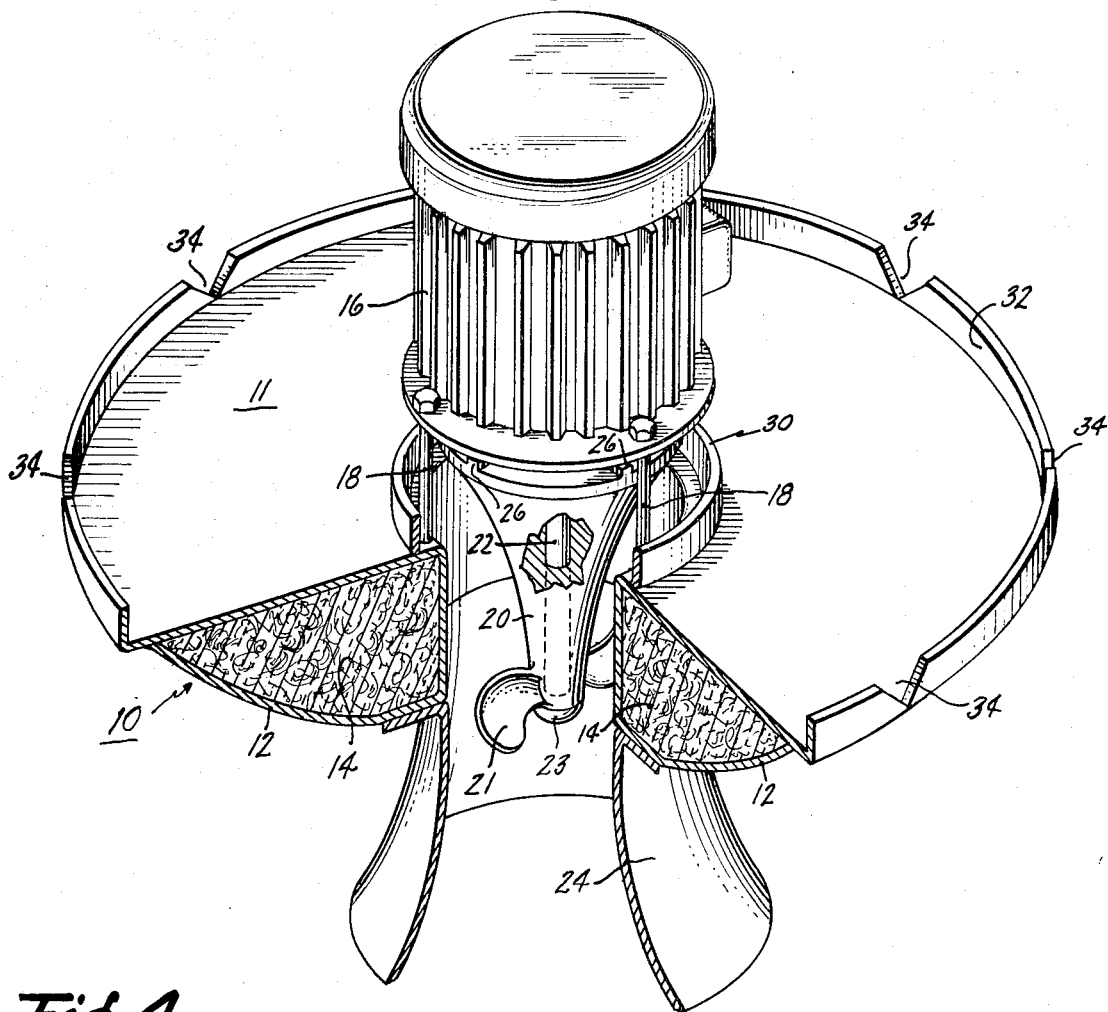

Referring to the drawings wherein like reference characters designate like or corresponding parts throughout the several views, there is shown in FIG. 1, a fiberglass float 10 having a curved bottom portion 12 constructed and arranged to furnish a void space which is filled with polyurethane foam 14. As shown, the float is provided with a central opening and a motor 16 is supported from the surface of the float 10 by supporting bars 18 or similar spacing members. The motor may be of conventional design to serve the intended purpose of pumping water. It may be a direct or alternating current motor, constant or variable speed but preferably totally enclosed, fan cooled, and having a rating up to about 100 horsepower. The lower end of the motor is equipped with a shaft seal designed to prevent the ingress of liquid into the motor housing.

The combination impeller-deflector 20 and its integrally formed propeller blades 21 is secured to the motor shaft 22 by a key and slot arrangement (not shown) and by a nut and hub 23 in a conventional manner. An outwardly flared inlet tube 24 having an inlet diameter greater than the discharge end is welded or otherwise secured to the float bottom 12 to provide for the smooth entry and flow of water to the propeller blades 21. The impeller-deflector 20 is conically shaped and of streamline configuration as illustrated for facilitating the upward flow and discharge of water outwardly from the aerator body. To help assure that water will not enter the motor housing past the shaft seal, the upper surface of the impeller-deflector has repelling vanes 26 which act to centrifugally throw outwardly any water which may enter the space between the motor housing and the top of the impeller.

The upper surface 11 of the float has collars 30 and 32 welded or otherwise secured to the surface 11 to form a receiving tray for the reception of a portion of the water pumped upwardly and outwardly by the impeller. Collar 32 extending around the outer peripheral surface is equipped with V-shaped notches 34. These notches are sized to permit the rate of water accumulation in the tray to exceed the rate of discharge through the V notches when the pump is circulating water.

Since the motor support bars 18 and collar 30 lie in the path of water being projected outwardly into the air, and since the water will be turbulent in view of the small flow path between the propeller blades and discharge from the aerator, a small portion of the pumped water will fall into the tray. The water which will therefore accumulate in the tray acts as a ballast to cause the aerator to sink lower in the water when operation commences as more fully described hereafter.

Figure 3:
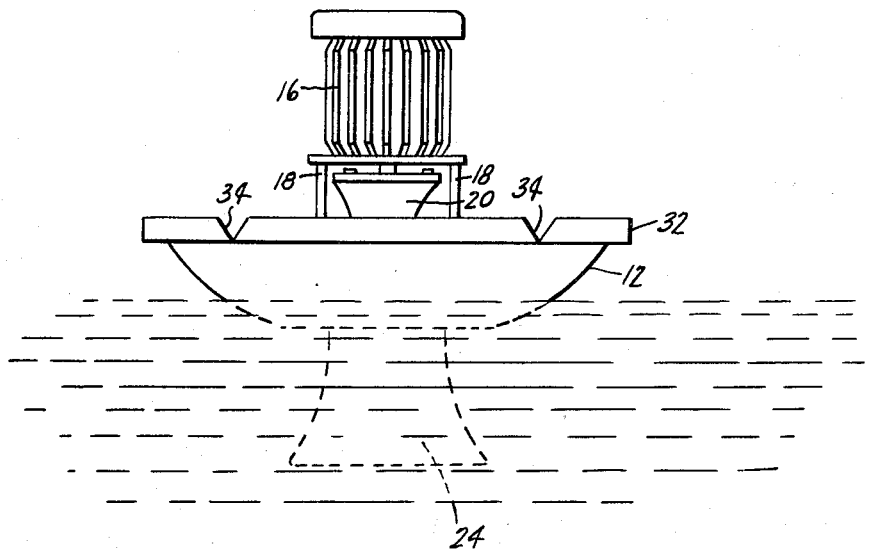

With the motor 16 at standstill and the water receiving tray dry, the float sits relatively high in the water, as shown in FIG. 3, and the upper portion of the blades 21 break or almost break the water surface. As the motor is started, the impeller blades commence rotating under light load conditions compared to the high load forces of deeply submerged propellers of the prior art, thus imposing minimum load on the motor thrust and guide bearings. As the motor accelerates, water is projected by the blades and deflector upwardly and outwardly across the tray with the major portion falling back to the water surface. A minor portion will fall into the tray because the pumped water will strike supports 18 and collar 30 and because turbulence will reduce the velocity of a small fraction of the water pumped. Simultaneous with this action, the tray starts to fill and the thrust forces of the blades pulls the complete aerator downwardly in the water. The water thus deposited on the tray serves as a ballast for the unit and as the additional downward forces of the blades tending to submerge the aerator balance the buoy and forces an equilibrium condition is established in the water. Slight variations in load thereafter encountered by the impeller will cause the aerator to seek different elevations in the water but the pumping action will not be affected.

Upon completion of the operation, the impeller blades will stop rotating thus removing the downward thrust forces and the aerator will rise in the water. Simultaneously, the accumulated water in the tray will drain through the V notches thus making the aerator more buoyant and permitting it to rise in the water until the impeller blades are again only partially submerged. The unit is then ready to again start under light load or soft-start conditions.

In view of the non-corrosive, high strength, long life and machinability characteristics of reinforced fiberglass, it is preferable that as many aerator components as possible be made from this type material. Obviously, metal or resinous compositions may be used in the construction.

The aerator thus disclosed eliminates the unwanted features heretofore incorporated in prior designs, such as submerged guide bearings, long overhung cantilevered shafts, flexible couplings between the motor shaft and driven impeller, and mechanical shaft seals. Such elimination reduces the cost of manufacture and maintenance while still making possible the design of a more efficient unit.

The soft-start feature is of particular importance from the standpoint of efficiency while still permitting the designer to accurately estimate the loads and utilize operating components which need not be over-designed for the tasks to be performed.

Although the invention has been disclosed with respect to an aerator for waste water treatment systems, it is obvious that aerators of smaller, or larger, designs may be made for use in aerating water where the need exists for adding oxygen to it for desirable purposes.

Figure 4:
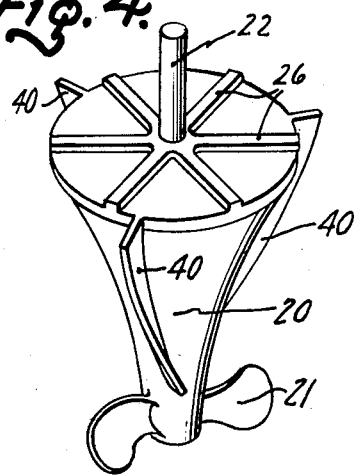
FIG. 4 is a detailed view of the design of deflector and arrangement for coupling the rotating element of the motor shaft.
Figure 2:
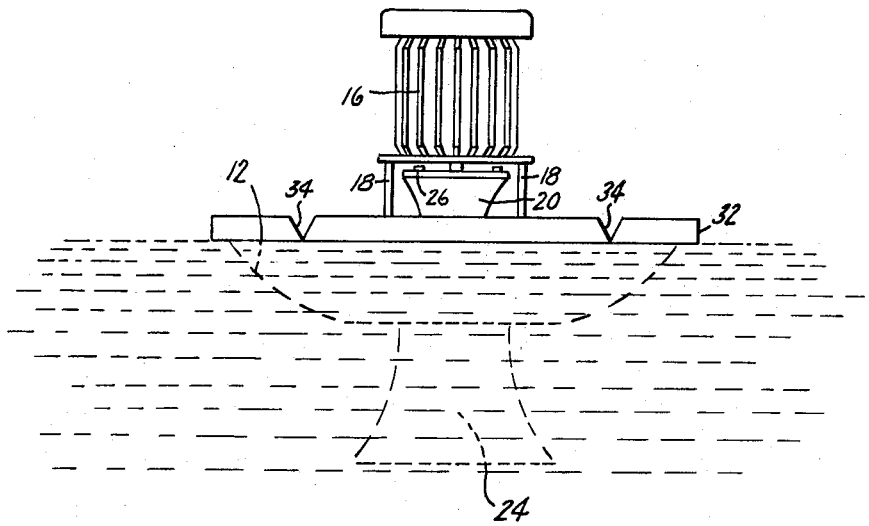
FIGS. 2 and 3 illustrate the aerator operating and non-operating positions respectively when placed in a body of water.

In view of the above, it will be apparent that many modifications and variations will occur to those skilled in the art. For example, different types of conventional impellers and propellers may be used for pumping purposes. As shown in FIG. 4, deflectors 40 of helical or other configuration may be located on the impeller surface for imparting direction to the pumped water. Also, the particular arrangement for coupling the motor shaft to the impeller-deflector may be used, such as using an intermediate plate which may be integrally cast with the motor shaft and then direct connected by bolts, or through torsional or other flexible coupling means, to the impeller-deflector combination. The sides of the float 11 may for example be used for collecting water for ballast purposes and a variable speed motor may be used for controlling the volume and rate of water discharged from the aerator. It therefore is to be understood that within the scope of the appended claims, the invention may be practised other than as specifically described.

What I claim as new and desire to secure by United States Letters Patent is

1. An aerator adapted for positioning on the surface of a pond for transferring oxygen from the atmosphere to water comprising:

a buoyant pontoon having a central opening extending through the pontoon body for providing a channel through which water flows towards the water surface;

a motor supported by said pontoon with its axis lying on the axis of said pontoon opening, water propulsion means positioned in alignment with said opening and attached to the motor shaft so that when the motor is operated, the propulsion means pumps water upwardly through said opening for discharge outwardly from said pontoon for transferring oxygen from the atmosphere to the water prior to its return to the pond, container means on the upper surface of said pontoon for holding a portion of said pumped water, said pumped water acting as a ballast for the aerator during the time water is being pumped into the atmosphere for aeration, and means associated with said container means for permitting water flow therefrom when the water propulsion means is in operation and to permit drainage of the container means when the water propulsion means is not in operation to thereby permit the aerator to rise higher in the water.

2. The combination according to claim 1 wherein said water propulsion means comprises an impeller located adjacent the bottom entrance of said central opening in the pontoon.

3. The combination according to claim 1 wherein said water propulsion means comprises an impeller having blades located in alignment with said opening, and an intake tube secured to the bottom of said float and in alignment with said opening for furnishing a channel through which water is drawn by said impeller prior to being discharged outwardly into the atmosphere.

4. The combination according to claim 1 wherein said water propulsion means comprise propeller blades located within the opening defined by the walls of said pontoon and the upper surface of said blades being positioned to just break the water surface when the motor is not operating, said blades being effective to pull the aerator downwardly in the water when the motor operates to obtain blade rotation at a deeper depth in the water.

5. The combination according to claim 4 wherein a minor portion of the water falls in said container means for furnishing ballast to the aerator during the pumping operation.

6. The combination according to claim 1 wherein said container means comprises the upper surface of said pontoon; collar means extending around the pontoon outer peripheral surface and around said opening thus defining a space therebetween which forms a tray for the reception of a portion of the pumped water.

7. The combination according to claim 6 wherein said container means includes spaced gates in said outside collar means for permitting water flow from said tray back into the pond.

8. A combination according to claim 7 wherein said spaced gates are sized to permit water flow from said tray at a rate less than the rate of accumulation of water in said tray to thereby provide a ballast for said aerator during operation.

9. An aerator adapted for positioning on the surface of a pond for transferring oxygen from the atmosphere to water comprising:

a buoyant pontoon having a central opening extending through the pontoon body for providing a channel through which water flows toward the water surface;

a motor supported by said pontoon with its axis lying on the axis of said pontoon opening;

a combined impeller-deflector attached to the motor shaft and extending down into said opening for pumping water upwardly through said opening and outwardly therefrom across said pontoon for transferring oxygen from the atmosphere to said water prior to its return to the pond; and a container on the surface of said pontoon formed by a pair of upstanding flanges respectively positioned around the outer peripheral surface of said pontoon and said opening; said outer flange having multiple discharge openings therein, the sum of the size of said openings being such that water accumulates in said container faster than that being discharged through said flanged openings when the motor is operated at rated speed, said water in the container serving as a ballast for holding the aerator submerged when the impeller is placed in operation.

10. The combination according to claim 9 wherein the blades of said impeller are located adjacent the pond's surface such that a minor portion of said blades extend through the water surface during the time that the motor is not in operation; and wherein the combined effect of the ballast and the forces imposed on said blades as a result of the pumping action causes the aerator to sink to a lower equilibrium position when the motor is operating at its designed operating speed and the impeller is pumping water through the aerator.

11. The method of operating an aerator of the type which includes a pontoon having a central opening therein, a motor mounted on said pontoon and having an impeller on said motor shaft with its propeller blades just breaking the surface of the water when the pump is not operating comprising the steps of:

operating said motor to secure rotation of the impeller blades under minimum thrust forces as a result of the impeller blades being located adjacent the water surface, pumping water through the opening and having a major portion thereof returned to the pond while a minor portion falls into a container on the float surface, permitting the accumulation of water in said container to serve as ballast for the aerator, continuing rotation of the impeller to cause the aerator to seek a lower position in the water as a result of the combined effect of weight of the aerator, water ballast and the forces generated by the impeller blades when acting in a direction opposite to the pontoon buoyant forces; and continuing operation as aforementioned until an equilibrium condition is reached between the downward and upward forces acting on the aerator, stopping said motor to remove the downward forces generated by the blades to allow the aerator to rise in the water, and draining water from said container to return the aerator to its highest buoyant position in the water.

* * * * *